(12) United States Patent
Chen et al.

(10) Patent No.: US 12,097,468 B2
(45) Date of Patent: Sep. 24, 2024

(54) EXTERNAL PRESSURE TYPE HOLLOW FIBER MEMBRANE COMPONENT, FILTRATION MEMBRANE COMPONENT, AND MEMBRANE FILTRATION MODULE

(71) Applicant: HAINAN LITREE PURIFYING TECHNOLOGY CO., LTD., Haikou (CN)

(72) Inventors: Qing Chen, Haikou (CN); Chen Chen, Haikou (CN); Lianggang Chen, Haikou (CN)

(73) Assignee: HAINAN LITREE PURIFYING TECHNOLOGY CO., LTD., Haikou (CN)

( * ) Notice: Subject to any disclaimer, the term of this patent is extended or adjusted under 35 U.S.C. 154(b) by 100 days.

(21) Appl. No.: 17/596,810

(22) PCT Filed: Sep. 17, 2020

(86) PCT No.: PCT/CN2020/115881
§ 371 (c)(1),
(2) Date: Dec. 17, 2021

(87) PCT Pub. No.: WO2021/073349
PCT Pub. Date: Apr. 22, 2021

(65) Prior Publication Data
US 2022/0250008 A1  Aug. 11, 2022

(30) Foreign Application Priority Data

Oct. 15, 2019  (CN) .......................... 201910978302.9
Oct. 15, 2019  (CN) .......................... 201910979092.5

(51) Int. Cl.
*B01D 65/02*  (2006.01)
*B01D 63/02*  (2006.01)
(Continued)

(52) U.S. Cl.
CPC ............. *B01D 65/02* (2013.01); *B01D 63/02* (2013.01); *B01D 63/04* (2013.01); *B01D 69/08* (2013.01);
(Continued)

(58) Field of Classification Search
CPC ........ B01D 65/02; B01D 63/04; B01D 69/08; B01D 2313/20; B01D 2313/21; B01D 2321/185; B01D 63/02; C02F 1/444
See application file for complete search history.

(56) References Cited

U.S. PATENT DOCUMENTS 5,536,403 A * 7/1996 Sugimoto ............... C02F 1/444
210/287
2004/0238431 A1 * 12/2004 Johnson ............... B01D 63/046
210/321.89
(Continued)

FOREIGN PATENT DOCUMENTS

| CN | 201482424 U | 5/2010 |
| CN | 202289881 U | 7/2012 |

(Continued)

OTHER PUBLICATIONS

Micke, DE102011110591 A1, English machine translation (Year: 2013).*

(Continued)

*Primary Examiner* — Clare M Perrin
(74) *Attorney, Agent, or Firm* — HSML P.C.

(57) ABSTRACT

The present disclosure relates to an external pressure type hollow fiber membrane component, a filtration membrane component, and a membrane filtration assembly, and provides an external pressure type hollow fiber membrane component, comprising: a housing having an inner cavity; and two end parts respectively provided at two ends of the inner cavity of the housing, the end parts being provided (Continued)

with a plurality of void passages running through the end parts in the axial direction of the housing and a plurality of water collection passages communicated with each other, and the void passages and the water collection passages are staggered at intervals. The present disclosure also provides a filtration membrane component and a membrane filtration assembly.

17 Claims, 11 Drawing Sheets

(51) Int. Cl.
    *B01D 63/04*         (2006.01)
    *B01D 69/08*         (2006.01)
    *C02F 1/44*          (2023.01)

(52) U.S. Cl.
    CPC ...... *B01D 2313/20* (2013.01); *B01D 2313/21* (2013.01); *B01D 2321/185* (2013.01)

(56) References Cited

U.S. PATENT DOCUMENTS

| | | | | |
|---|---|---|---|---|
| 2009/0050555 | A1* | 2/2009 | Baba | B01D 65/02 156/65 |
| 2015/0122715 | A1* | 5/2015 | Collignon | B01D 65/02 137/13 |
| 2016/0114292 | A1* | 4/2016 | Colby | B01D 63/024 210/151 |
| 2016/0207004 | A1* | 7/2016 | Volmering | B01D 65/02 |
| 2017/0259196 | A1* | 9/2017 | Foix | B01D 35/301 |
| 2018/0333681 | A1* | 11/2018 | Nakanishi | B01D 71/34 |

FOREIGN PATENT DOCUMENTS

| | | | | |
|---|---|---|---|---|
| CN | 103118766 | | 5/2013 | |
| CN | 105036315 | | 11/2015 | |
| CN | 106669425 | | 5/2017 | |
| CN | 206198957 | U | 5/2017 | |
| CN | 110652878 | | 1/2020 | |
| CN | 110652879 | | 1/2020 | |
| DE | 102011110591 | A1 * | 2/2013 | ............ B01D 63/02 |
| EP | 947237 | A1 * | 10/1999 | ........... B01D 63/024 |
| KR | 20060019245 | | 3/2006 | |
| KR | 20160039118 | A * | 4/2016 | |
| WO | 2013100272 | | 7/2013 | |

OTHER PUBLICATIONS

Zsi, Amazon, Beta Clamps (Year: 2017).*
Huh, KR20160039118 A, English machine translation (Year: 2016).*
US Water, Water Filter Housings (Year: 2018).*
Wegener, Metal vs Plastic (Year: 2021).*
Meng, CN201482424 U, English machine translation (Year: 2010).*
Heine, EP0947237 A1, English machine translation (Year: 1999).*
International Search Report issued for International Patent Application No. PCT/CN2020/115881, Date of mailing: Dec. 17, 2020, 7 pages including English translation.

* cited by examiner

EXTERNAL PRESSURE TYPE HOLLOW FIBER MEMBRANE COMPONENT, FILTRATION MEMBRANE COMPONENT, AND MEMBRANE FILTRATION MODULE

TECHNICAL FIELD

The present disclosure relates to the field of membrane filtration separation, in particular to an external pressure type hollow fiber membrane assembly, a filtration membrane assembly and a membrane filtration module.

BACKGROUND ART

Membrane separation technology has been widely used in fields such as water purification treatment or liquid filtration separation. Generally, hollow fiber membrane assemblies are classified into two types according to different filtration directions: an internal pressure type and an external pressure type. When the external pressure type hollow fiber membrane assembly is working, raw water arrives at the outside of the hollow fiber membrane in the pressure housing, and then passes through the hollow fiber membrane to the inner cavity of the hollow fiber membrane to form a filtrate, wherein pollutants are trapped at the outside of the hollow fiber membrane. Thus, the external pressure type hollow fiber membrane assembly may be used for raw water containing high concentration of pollutants.

However, when the external pressure type hollow fiber membrane assembly is used to filter raw water containing high concentration of pollutants, the pollutants trapped at the outside of the hollow fiber membrane are likely to accumulate at the root of the hollow fiber membrane. Therefore, it is necessary to increase the filtration energy consumption of the external pressure type hollow fiber membrane assembly to maintain water production that influences the external pressure type hollow fiber membrane assembly. In a serious case, the filtration efficiency of the external pressure type hollow fiber membrane assembly is even reduced.

In addition, according to the prior art, a gas transmission passage is usually provided at the lower end of the filtration membrane assembly to drive the filtered dirt or large particulate matter with air pressure to avoid separation from the filtration membrane. However, when forming a membrane filtration module by assembling a plurality of filtration membrane assemblies, due to the arrangement of the gas transmission passage, a plurality of gas transmission pipelines connected to the gas transmission passage need to be provided, so that the structure of the membrane filtration module is complicated, and the membrane filtration module occupies a large space.

SUMMARY

In view of the above problems, it is necessary to provide an external pressure type hollow fiber membrane assembly that can effectively alleviate the accumulation of pollutants at the roots of the hollow fiber membrane filaments, and a filtration membrane assembly that allows the assembled membrane filtration module to have a simple structure and occupy a small space.

In one aspect, the present disclosure provides an external pressure type hollow fiber membrane assembly, comprising:
a housing having an inner chamber; and
two end members provided at two ends of the inner chamber of the housing respectively, wherein each of the end members is provided with a plurality of void passages extending through the end member along an axial direction of the housing, and a plurality of water collection passages in communication with each other, wherein the void passages and the water collection passages are provided alternately.

In the above external pressure type hollow fiber membrane assembly, both of the two end members are provided with void passages, so that raw water or aeration gas can be smoothly discharged from the inner chamber of the housing. As a result, pollutants at an outside of hollow fiber membrane filaments can flow out of the void passages conveniently, thereby avoiding unduly accumulation of pollutants at the roots of the hollow fiber membrane filaments. Thus, the filtration energy consumption of the external pressure type hollow fiber membrane assembly can be reduced while the filtration efficiency of the external pressure type hollow fiber membrane assembly is guaranteed.

In an embodiment, in a direction perpendicular to an axial direction of the housing, an extending direction of the void passage is a straight line, and a plurality of the void passages are parallel to each other.

In an embodiment, the external pressure type hollow fiber membrane assembly further comprises a plurality of hollow fiber membrane bundles provided in the inner chamber of the housing; and the hollow fiber membrane bundles have a width of less than or equal to 60 mm.

In an embodiment, a ratio of a width of the water collection passage to a width of the void passage is less than 6.

In an embodiment, the external pressure type hollow fiber membrane assembly further comprises a plurality of hollow fiber membrane bundles provided in the inner chamber of the housing, wherein in a direction perpendicular to an axial direction of the housing, the hollow fiber membrane bundle has a cross section that is circular and has an outer diameter of less than 60 mm.

In an embodiment, in a direction perpendicular to an axial direction of the housing, the void passage has a cross section that is fan-shaped or annular-sector-shaped.

In an embodiment, a cross-sectional area of the void passage perpendicular to an axial direction of the housing decreases gradually from outside to inside in an axial direction of the housing.

In an embodiment, the external pressure type hollow fiber membrane assembly further comprises a first end cap hermetically connected to an end of the housing, and a pulse aerator is provided at a side of the first end cap proximal to the inner chamber of the housing.

In an embodiment, the pulse aerator has a gas stream release hole proximal to the end member, and the gas stream release hole is coaxial with the pulse aerator.

In another aspect, the present disclosure further provides a filtration device comprising the external pressure type hollow fiber membrane assembly provided by the present disclosure.

In the above filtration device, both of the two end members are provided with void passages, so that raw water or aeration gas can be smoothly discharged from the inner chamber of the housing. As a result, pollutants at an outside of hollow fiber membrane filaments can flow out of the void passages conveniently, thereby avoiding unduly accumulation of pollutants at the roots of the hollow fiber membrane filaments. Thus, the filtration energy consumption of the external pressure type hollow fiber membrane assembly can be reduced while the filtration efficiency of the external pressure type hollow fiber membrane assembly is guaranteed.

In still another aspect, the present disclosure further provides a filtration membrane assembly, comprising:
a housing comprising: an inner chamber, and a first end and a second end opposite to each other; and
a first end cap hermetically, fixedly connected to the first end of the housing, wherein the first end cap has a gas transmission passage which communicates with the inner chamber of the housing and opens at both sides.

When the filtration membrane assemblies as described above are assembled into a membrane filtration module, the gas transmission passages of adjacent filtration membrane assemblies are connected to exempt necessity to provide a separate gas transmission pipeline for each filtration membrane assembly. As such, the assembled membrane filtration module has a simple structure and occupies a small space.

In an embodiment, the first end cap further has a first water stream passage which communicates with the inner chamber of the housing and opens at both sides, wherein the first water stream passage can be joined end-to-end to a water stream passage of another filtration membrane assembly;

The filtration membrane assembly further comprises a connection assembly which can be removably connected to both an opening of the gas transmission passage and an opening of the first water stream passage.

In an embodiment, the connection assembly comprises two double-orifice hoop halves which can be removably joined end-to-end, wherein, after the two double-orifice hoop halves are joined end-to-end, two orifices are formed for connection to the opening of the gas transmission passage and the opening of the first water stream passage respectively.

In an embodiment, an outer side wall of the gas transmission passage proximal to one of the openings forms a first abutting section, and an outer side wall of the gas transmission passage proximal to the other of the openings forms a second abutting section.

In an embodiment, the filtration membrane assembly further comprises a second end cap which is hermetically, fixedly connected to the second end of the housing, wherein the first end cap is hermetically connected to the housing with a hermetic connection assembly, and/or the second end cap is hermetically connected to the housing with a hermetic connection assembly; the first end cap and the second end cap each have a connection section which can be sleeved on the housing, wherein an outer surface of the connection section is provided with an external thread.

The hermetic connection assembly comprises:
a threaded sleeve which can be sleeved on the housing, wherein an inner surface of the threaded sleeve comprises: an internal thread that matches the external thread of the first end cap, and an abutting surface; and
an anti-dropping piece which can be sleeved on the housing, wherein an outer side surface of the anti-dropping piece is used for abutting against the abutting surface of the threaded sleeve.

In an embodiment, the abutting surface of the threaded sleeve is a tapered surface; the anti-dropping piece is in a shape of a broken loop; an inner surface of the anti-dropping piece is a tooth surface; and the anti-dropping piece has a hardness greater than that of the housing.

In an embodiment, the hermetic connection assembly further comprises a second sealing ring provided between the housing and the connection section of the first end cap or the connection section of the second end cap.

In an embodiment, the hermetic connection assembly further comprises a stopper sleeved on the housing; an inner surface of the connection section of the first end cap has a first limit face; the stopper has a second limit face disposed opposite to the first limit face; the second limit face is not parallel to an axial direction of the housing; both ends of the second sealing ring abut against the first limit face and the second limit face; an end of the stopper distal from the second sealing ring abuts against the anti-dropping piece.

In an embodiment, the filtration membrane assembly further comprises a hollow fiber membrane and a second end cap hermetically, fixedly connected to the second end of the housing, wherein the second end cap is provided with a second water stream passage and a purified water stream passage, wherein the second water stream passage communicates with an outside of the hollow fiber membrane; wherein the membrane filtration module further comprises a pressurizing pipeline in communication with the second water stream passage, wherein a spacing between the pressurizing pipeline and the second end of the housing is greater than a spacing between the purified water stream passage and the second end of the housing.

In an embodiment, the hollow fiber membrane is the external pressure type hollow fiber membrane assembly provided in the present disclosure.

In yet another aspect, the present disclosure further provides a membrane filtration module, comprising:
the filtration membrane assembly provided by the present disclosure; and
a connection assembly for realizing connection of the openings of the gas transmission passages of adjacent filtration membrane assemblies.

The above-mentioned membrane filtration module facilitates connection of the gas transmission passages of adjacent filtration membrane assemblies, and thus exempts necessity to provide a gas transmission pipeline for each filtration membrane assembly separately. In other words, the assembled membrane filtration module has a simple structure and occupies a small space.

DETAILED DESCRIPTION

Figure 1:
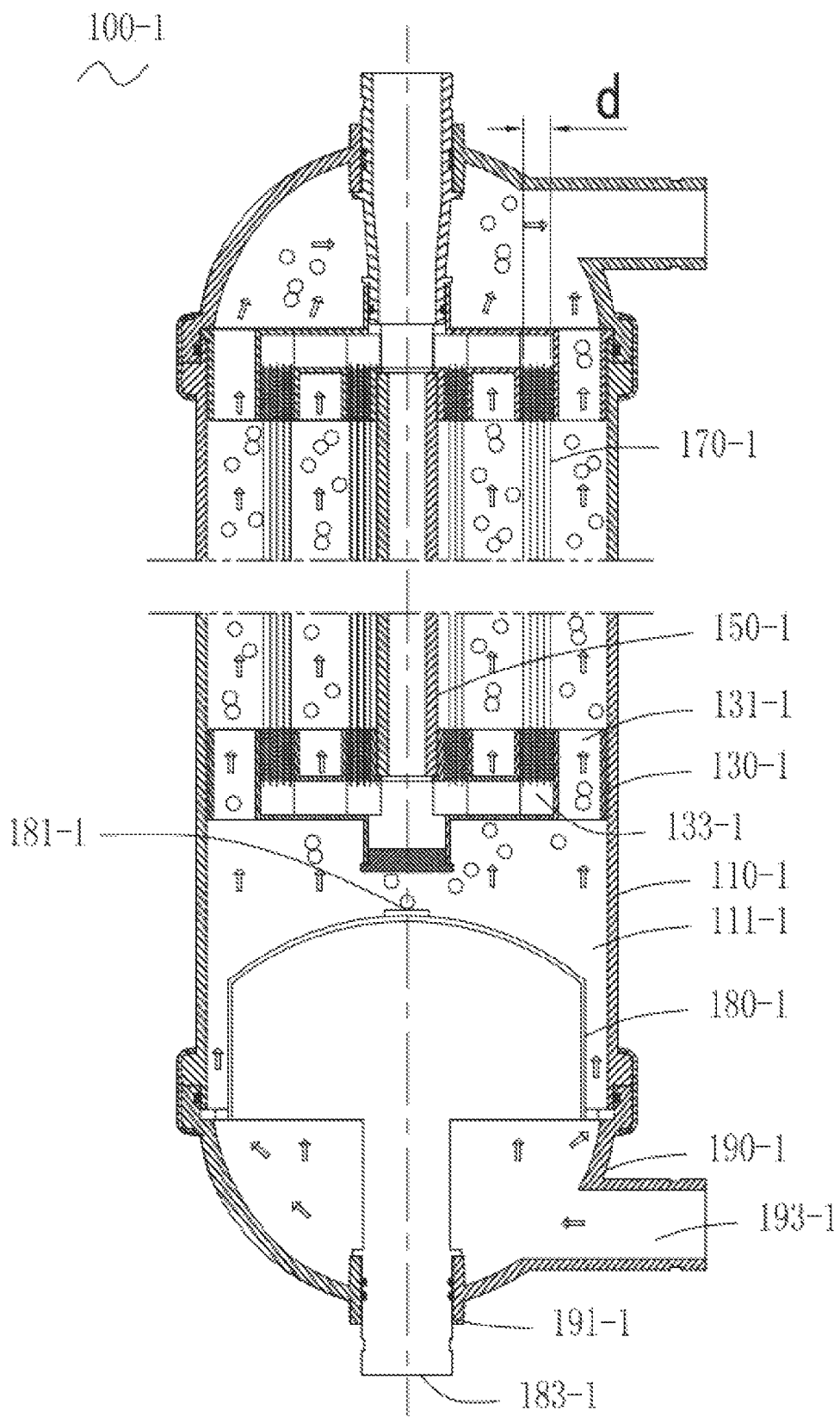
FIG. 1 is a schematic view showing a structure of an external pressure type hollow fiber membrane assembly provided according to an embodiment of the present invention.
Figure 2:
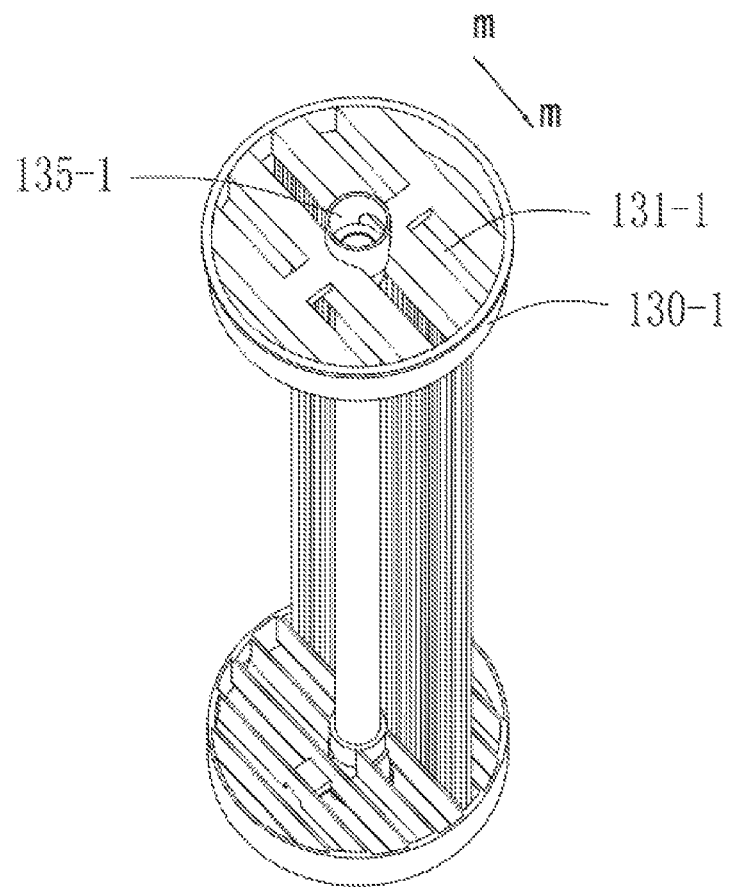
FIG. 2 is a schematic view showing a partial structure of the external pressure type hollow fiber membrane assembly in FIG. 1.

In order to make the objects, features and advantages of the present invention more apparent and easily understandable, particular embodiments of the present invention are described in detail with reference to the drawings. In the following description, a number of specific details are set forth for full understanding of the present invention. However, the present invention can be implemented in many other ways different from those described herein, and those skilled in the art can make similar modifications without departing from the spirit of the present invention. Therefore, the present invention is not limited to the specific embodiments disclosed below.

It should be noted that when an element is referred to as being "fixed to" another element, it may be directly on the other element, or an intervening element may also be present. When an element is considered to be "connected" to another element, it may be directly connected to the other element or an intervening element may be present.

Unless otherwise defined, all the scientific and technical terms used herein have the same meanings as commonly understood by a person of ordinary skill in the art to which the present disclosure pertains. The terms used in the description of the present invention herein are only for the purpose of describing specific embodiments, not intended to limit the present invention. The term "and/or" as used herein includes any and all combinations of one or more related items listed therefor.

As shown in FIGS. 1 to 4, an external pressure type hollow fiber membrane assembly 100-1 provided according to an embodiment of the present invention comprises a housing 110-1 having an inner chamber 111-1, and an end member 130-1.

Specifically, the end member 130-1 is provided at an end of the inner chamber 111-1 of the housing 110-1. The end member 130-1 is provided with a plurality of void passages 131-1 extending through the end member 130-1 in an axial direction of the housing 110-1 and a plurality of water collection passages 133-1 in communication with each other. The void passages 131-1 and the water collection passages 133-1 are provided alternately. The axial direction of the housing 110-1 is shown by the dashed line in FIG. 1.

As it can be appreciated, the void passage 131-1 is used to discharge pollutants at the outside of the hollow fiber membrane filaments, so the width of the void passage 131-1 needs to enable discharge the pollutants at the outside of the hollow fiber membrane filaments.

It should be noted that a plurality of void passages 131-1 means that the number of the void passages 131-1 is at least two. A plurality of water collection passages 133-1 means that the number of the water collection passages 133-1 is also at least two.

In the external pressure type hollow fiber membrane assembly 100-1, both of the two end members 130-1 are provided with void passages 131-1, so that in the process in which raw water or aeration gas enters the inner chamber of the housing 110-1 and then exits the inner chamber 111-1 of the housing 110, it is input or output through the two ends of the inner chamber 111-1. As such, when the raw water or aeration gas enters the inner chamber 111-1 of the housing 110-1 or exits the inner chamber 111-1 of the housing 110-1, forced change of the flow direction of the raw water or aeration gas is avoided, so that the raw water or aeration gas can be discharged from the inner chamber of the housing smoothly. The void passages 131-1 can facilitate outflow of the pollutants at the outside of the hollow fiber membrane filaments, and unduly accumulation of the pollutants at the roots of the hollow fiber membrane filaments is avoided, thereby reducing the filtration energy consumption of the external pressure type hollow fiber membrane assembly 100-1 while the filtration efficiency of the external pressure type hollow fiber membrane assembly 100-1 is guaranteed.

In this embodiment, the void passages 131-1 of the two end members 130-1 are provided opposite to each other. In other words, the projections of the void passages 131-1 of the two end members 130-1 on a plane perpendicular to the axial direction of the housing 110-1 overlap. This makes the input and output of the raw water and aeration gas smoother. Of course, in another feasible embodiment, it's also possible that the void passages 131-1 of the two end members 130-1 are not provided completely opposite to each other.

It can be understood that the inner chamber of the hollow fiber membrane filament communicates with the water collection passage 133-1. The void passage 131-1 and the water collection passage 133-1 are alternately provided, that is, the plurality of water collection passages 133-1 are provided with every two of them being spaced. In addition, each water collection passage 133-1 corresponds to a separate hollow fiber membrane bundle. Therefore, the hollow fiber membrane bundle corresponding to each water collection passage 133-1 is provided independently.

In this embodiment, the end member 130-1 is provided with at least two void passages 131-1, and the void passages 131-1 and the water collection passages 133-1 are provided alternately, thereby increasing the exposed area of the hollow fiber membrane bundles, so that when raw water enters the inner chamber 111-1 of the housing 110-1, or when aeration gas enters the inner chamber 111-1 of the housing 110-1, it can contact the hollow fiber membrane filaments at a larger area, so as to flush out more pollutants on the hollow fiber membrane filaments.

In addition, in this embodiment, the exposed area of the hollow fiber membrane bundle is increased to reduce the thickness of the pollutants adhered to the outer surface of the hollow fiber membrane bundle, so that the adhesion of the pollutants has a lower impact on the filtration efficiency of the hollow fiber membrane bundle, which in turn makes the pollutants on the surface of the hollow fiber membrane bundle easier to clean. This saves the cleaning time of the external pressure type hollow fiber membrane assembly 100-1, and further improves the filtration efficiency of the external pressure type hollow fiber membrane assembly 100-1.

Optionally, the material of the end member 130-1 is plastic, rubber, stainless steel or resin. When the end member is formed from a resin material, the end member 130-1 is cast-molded, and at the same time is cast together with the inner wall of the housing 110-1 and the hollow fiber membrane filaments, wherein the end face outlets of the hollow fiber membrane filaments are kept open.

In this embodiment, the external pressure type hollow fiber membrane assembly 100-1 further comprises a water collection pipeline 150-1 in communication with the water collection passages 133-1. The filtrate in the inner cavity of a hollow fiber membrane at least partially flows into a water collection passage 133-1, and then flows into the central water collection pipeline 150-1 in communication with the water collection passage 133-1. Then, the filtrate is discharged.

It can be understood that the end member 130-1 needs to be provided with a structure for connecting the water collection pipeline 150-1, so that the water collection pipeline 150-1 communicates with the water collection passage 133-1. Specifically, in this embodiment, the end member 130-1 is provided with a water collection pipeline interface 135-1 which communicates with the water collection passages 133-1 and matches the water collection pipeline 150-1. In the axial direction of the housing 110-1, the axis of the collection pipeline interface 135-1 is collinear with the axis of the end member 130-1. Of course, in another feasible embodiment, in the axial direction of the housing, the axis of the water collection pipeline interface may also be offset from the axis of the end member.

In this embodiment, the end member 130-1 and the housing 110-1 are removably assembled with a hoop. Of course, in another feasible embodiment, the end member 130-1 and the housing 110-1 may also be assembled and connected by bonding or the like.

In this embodiment, both of the two end members 130-1 are provided with water collection passages 133-1, so that the filtrate in the inner cavity of the hollow fiber membrane can flow smoothly into the water collection passages 133-1, facilitating discharge of the filtrate. Specifically, during use, the two end members 130-1 generally have a height difference in a direction perpendicular to the horizontal plane, so that under the action of gravity, the filtrate in the inner cavity of the hollow fiber membrane can flow smoothly to the water collection passages 133-1 of the lower end member 130-1. Of course, when the water pressure of the raw water is higher than the water pressure of the purified water in the water collection passages 133-1 of the upper end member 130-1, it is also convenient for the filtrate in the inner cavity of the hollow fiber membrane to be discharged smoothly into the water collection passages 133-1 of the upper end member 130-1. That is, the filtrate in the inner cavity of the hollow fiber membrane can be discharged from both ends at the same time, thereby increasing the discharge speed of the filtrate from the inner cavity of the hollow fiber membrane, which in turn improves the filtration efficiency of the external pressure type hollow fiber membrane assembly 100-1.

In this embodiment, in a direction perpendicular to the axial direction of the housing 110-1, the extending direction of the void passages 131-1 is a straight line, and a plurality of void passages 131-1 are parallel to each other. In this embodiment, the extending direction of the void passages 131-1 is the direction of the surface where a void passage 131-1 and a water collection passage 133-1 join, as shown by the direction m-m in FIG. 2.

Accordingly, the extending direction of the water collection passages 133-1 is the same as the extending direction of the void passages. The structure of the hollow fiber membrane bundles is also configured in accordance with the structure of the water collection passages 133-1. That is, the structure of the hollow fiber membrane bundles also extends along a straight line.

There are void passages 131-1 on both sides of a water collection passage 133-1, thereby preventing the hollow fiber membrane bundles from accumulating pollutants locally, and enabling uniform cleaning of the hollow fiber membrane bundles. The phenomenon that the pollutants locally adhered to the hollow fiber membrane cannot be cleaned up is avoided.

In this embodiment, the external pressure type hollow fiber membrane assembly 100-1 further comprises a plurality of hollow fiber membrane bundles 170-1 provided in the inner chamber 111-1 of the housing 110-1. The width d of the hollow fiber membrane bundle 170-1 is less than or equal to 60 mm. If the width of the hollow fiber membrane bundle 170-1 is larger, more pollutants will adhere to the surface of the hollow fiber membrane bundle 170-1.

Optionally, a ratio of the width D1 of the water collection passage 133-1 to the width D2 of the void passage 131-1 is less than 6. The width D1 of the water collection passage 133-1 is greater than or equal to the width d of the hollow fiber membrane bundle 170-1. Hence, a ratio of the width d of the hollow fiber membrane bundle 170-1 to the width D2 of the void passage 131-1 is less than 6. Therefore, large pollutants can smoothly pass through the void passage 131-1 and be discharged, avoiding the circumstance in which the void passage 131-1 is blocked by large pollutants that cannot be discharged, and as a result, the external pressure type hollow fiber membrane assembly 100-1 cannot work properly. In addition, in the process of cleaning the external pressure type hollow fiber membrane assembly by aeration, larger bubbles can also pass through the void passage 131-1 smoothly, so as to achieve better cleaning of dirt from the surface of the hollow fiber membrane bundle 170-1.

Specifically, in this embodiment, a ratio of the width of the water collection passage 133-1 to the width of the void passage 131-1 may be 6, 5.5, 5, 4.5, 4, 3, 2, 1, or 0.5.

Detailed illustration is set forth below with reference to the transmembrane pressure differences listed in Table 1 during the operation of the external pressure type hollow fiber membrane assemblies 100-1 with different ratios of the width D1 of the water collection passage 133-1 to the width D2 of the void passage 131-1.

TABLE 1

Transmembrane pressure differences during the operation of the external pressure type hollow fiber membrane assemblies with different ratios of the width D1 of the water collection passage 133-1 to the width D2 of the void passage 131-1

| Running day | D1:D2 = 1/5 (D1 = 7 mm, D2 = 35 mm) Transmembrane pressure difference (KPa) | D1:D2 = 4/5 (D1 = 20 mm, D2 = 25 mm) Transmembrane pressure difference (KPa) | D1:D2 = 13/10 (D1 = 26 mm, D2 = 20 mm) Transmembrane pressure difference (KPa) | D1:D2 = 3 (D1 = 36 mm, D2 = 12 mm) Transmembrane pressure difference (KPa) | D1:D2 = 4 (D1 = 40 mm, D2 = 10 mm) Transmembrane pressure difference (KPa) | D1:D2 = 6 (D1 = 42 mm, D2 = 7 mm) Transmembrane pressure difference (KPa) |
|---|---|---|---|---|---|---|
| 0 | 15 | 16 | 26 | 30 | 32 | 35 |
| 1 | 19 | 22 | 37 | 40 | 41 | 45 |

TABLE 1-continued

Transmembrane pressure differences during the operation of the external pressure type hollow fiber membrane assemblies with different ratios of the width D1 of the water collection passage 133-1 to the width D2 of the void passage 131-1

| Running day | D1:D2 = 1/5 (D1 = 7 mm, D2 = 35 mm) Transmembrane pressure difference (KPa) | D1:D2 = 4/5 (D1 = 20 mm, D2 = 25 mm) Transmembrane pressure difference (KPa) | D1:D2 = 13/10 (D1 = 26 mm, D2 = 20 mm) Transmembrane pressure difference (KPa) | D1:D2 = 3 (D1 = 36 mm, D2 = 12 mm) Transmembrane pressure difference (KPa) | D1:D2 = 4 (D1 = 40 mm, D2 = 10 mm) Transmembrane pressure difference (KPa) | D1:D2 = 6 (D1 = 42 mm, D2 = 7 mm) Transmembrane pressure difference (KPa) |
|---|---|---|---|---|---|---|
| 2 | 24 | 30 | 58 | 75 | 80 | 82 |
| 3 | 28 | 36 | 82 | 102 | 121 | 134 |
| 4 | 32 | 46 | 120 | 136 | 140 | 151 |
| 5 | 36 | 68 | 126 | 158 | 159 | 170 |
| 6 | 37 | 70 | 138 | 159 | 169 | 179 |
| 7 | 38 | 72 | 136 | 161 | 172 | 185 |

Figure 3:
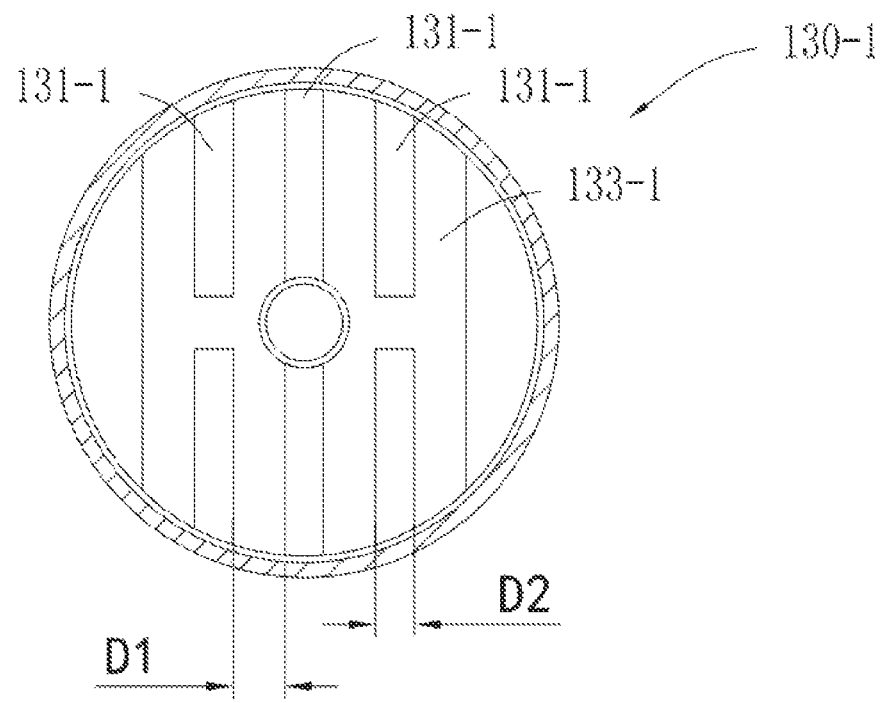
FIG. 3 is a cross-sectional view of the end member in FIG. 1.
Figure 4:
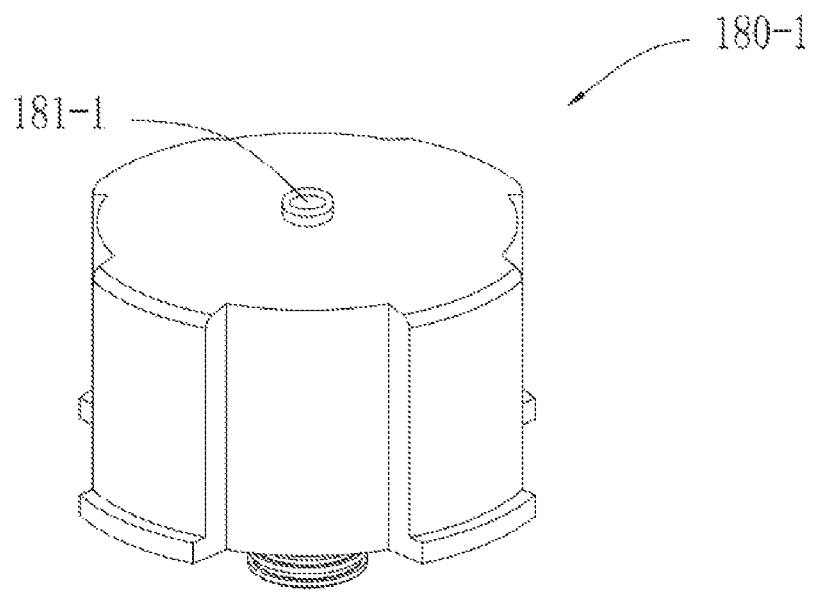
FIG. 4 is a schematic view showing a structure of the pulse aerator in FIG. 1.

D1 is the width of the water collection passage, and D2 is the width of the void passage. FIG. 3 may be referred to for more details. The data in Table 1 are measured under the following preconditions: the raw water has a sludge concentration of 14000 mg/L; the output of the water produced is 30 L/m$^2$·h; the water temperature is 25° C.; the size of the end member 130-1 remains unchanged; and the number of the water collection passages 133-1 and the number of the void passages 131-1 remain unchanged.

In addition, if the output of the water produced remains unchanged, when more and more pollutants accumulate on the surface of the hollow fiber membrane bundle 170-1, the transmembrane pressure difference will increase. Accordingly, the equipment requires greater energy consumption to operate.

As shown by the data in Table 1, within the same running time of the external pressure type hollow fiber membrane assembly 100-1, the smaller the ratio of the width D1 of the water collection passage 133-1 to the width D2 of the void passage 131-1, the smaller the transmembrane pressure difference. In other words, the smaller the ratio of the width D1 of the water collection passage 133-1 to the width D2 of the void passage 131-1 is, the fewer pollutants adhere to the outer surface of the hollow fiber membrane bundle 170-1. Further, the smaller the ratio of the width D1 of the water collection passage 133-1 to the width D2 of the void passage 131-1, the smaller the width of the water collection passage 133-1, and the larger the width of the void passage 131-1. Therefore, when the width of the hollow fiber membrane bundle 170-1 is smaller, the width of the void passage 133-1 is larger, and the transmembrane pressure difference is smaller, fewer pollutants will adhere to the surface of the hollow fiber membrane bundle 170-1.

In this embodiment, the void passages 131-1 on the end members 130-1 have the same structure and width. It can be understood that in another feasible embodiment, the void passages may also have different widths. Likewise, the void passages may have different structures. For example, rectangular void passages and fan-shaped void passages may coexist on the same end member.

In this embodiment, the external pressure type hollow fiber membrane assembly 100-1 further comprises a first end cap 190-1 hermetically connected to one end of the housing 110-1, and the first end cap 190-1 is provided with a pulse aerator 180-1 at the side proximal to the inner chamber 111-1 of the housing 110-1. In contrast to the traditional continuous aeration process in which a gas stream is delivered directly to the inner chamber of the housing through a gas transmission pipe, the air bubbles released by the pulse aerator 180-1 can enter the inner chamber 111-1 of the housing 110-1 directly through the void passages 131-1, thereby enabling better cleaning of the pollutants from the surface of the hollow fiber membrane bundles 170-1.

In addition, the pulse aerator 180-1 emits the gas stream in a pulse mode. Specifically, the pulse aerator 180-1 inputs a gas stream continuously during operation. The pulse aerator 180-1 can accumulate the energy of a continuous gas stream for a certain period of time and then provide instant aeration to form larger bubbles, so that the impact force of the emitted gas stream is greater, thereby further enabling better cleaning of the pollutants from the surface of the hollow fiber membrane bundles 170-1.

In this embodiment, the pulse aerator 180-1 has a gas stream release hole 181-1 proximal to the end member 130-1, and the gas stream release hole 181-1 is coaxial with the pulse aerator 180-1. As such, the pulse aerator 180-1 has only one gas stream release hole 181-1, so that the impact bubbles emitted from the gas stream release hole 181-1 are larger, which in turn provides a greater impact on the surface of the hollow fiber membrane bundles 170-1 to achieve better cleaning of the pollutants from the surface of the hollow fiber membrane bundles 170-1.

In this embodiment, the first end cap 190-1 is provided with an opening 191-1 for communicating the gas transmission port 183-1 of the pulse aerator 180-1 with the surroundings. Of course, in another feasible embodiment, if the structure of the pulse aerator is changed, the opening may also be used as a gas transmission passage to communicate with the gas transmission port of the pulse aerator.

It can be understood that in this embodiment, the first end cap 190-1 is provided with a water stream passage 193-1 for conveying raw water to or discharging concentrated water from the inner chamber 111-1 of the housing 110-1. The configuration of the pulse aerator 180-1 should not block the communication between the water stream passage 193-1 and the inner chamber 111-1 of the housing 110-1, and should enable the raw water to be smoothly conveyed to the inner chamber of the housing 110-1, or the concentrated water to be smoothly discharged from the water stream passage 193-1.

It can be understood that in another feasible embodiment, the structures of the void passage and water collection passage are not limited to those described above. Accordingly, the structure of the hollow fiber membrane bundle is not limited to that described above. For example, in a feasible embodiment, in a direction perpendicular to the axial direction of the housing, the cross section of the hollow fiber membrane bundle is circular, and the outer diameter is less than 60 mm to prevent adhesion of more pollutants to the hollow fiber membrane bundle. Optionally, in a direction perpendicular to the axial direction of the housing, the water collection passage is circular, and the hollow fiber membrane bundle and the water collection passage have the same structure. Of course, it can be understood that in another feasible embodiment, the structure of the hollow fiber membrane bundle is not limited to being similar to the structure of the water collection passage.

Detailed illustration is set forth below with reference to the transmembrane pressure differences listed in Table 2 during the operation of the external pressure type hollow fiber membrane assemblies.

TABLE 2

Transmembrane pressure differences of external pressure type hollow fiber membrane assemblies of different structures as operating time increases

| Running day | C1 (Traditional external pressure type hollow fiber membrane assembly) Transmembrane pressure difference (KPa) | C2 (External pressure type hollow fiber membrane assembly 100 with pulse aeration being changed into continuous aeration) Transmembrane pressure difference (KPa) | C2 (External pressure type hollow fiber membrane assembly 100) Transmembrane pressure difference (KPa) |
|---|---|---|---|
| 0 | 16 | 15 | 15 |
| 2 | 28 | 17 | 18 |
| 4 | 48 | 26 | 25 |
| 6 | 61 | 29 | 26 |
| 8 | 70 | 36 | 27 |
| 10 | 73 | 45 | 26 |
| 12 | 80 | 46 | 28 |
| 14 | 78 | 48 | 27 |
| 16 | 82 | 48 | 30 |

It should be noted that, in the traditional external pressure type hollow fiber membrane assembly, only one end member is provided with a void passage, and a continuous aeration mode is adopted. The pulse aeration in the external pressure type hollow fiber membrane assembly 100-1 is changed into continuous aeration. That is, the pulse aerator in the external pressure type hollow fiber membrane assembly 100-1 is removed, and a gas transmission pipe is used to input an impact gas stream to the inner chamber of the housing to realize flushing of the hollow fiber membrane bundle 170-1.

The data in Table 2 are measured under the following preconditions: the raw water has a sludge concentration of 14000 mg/L; the output of the water produced is 30 L/m²·h; the continuously input air flow is 2 m³/h; the water temperature is 25° C.; and the external pressure type hollow fiber membrane assemblies have the same size.

As it can be seen from the data in Table 2, when the data in each column are compared separately, such as the data in the first column C1, it can be found that as the external pressure type hollow fiber membrane assembly runs longer and longer, the transmembrane pressure difference becomes larger and larger. That is, more and more pollutants accumulate on the surface of the hollow fiber membrane bundles.

A comparison between the data in the first column C1 and the data in the second column C2 shows that the transmembrane pressure differences of C2 are smaller when the external pressure type hollow fiber membrane assemblies run for the same period of time. As such, after running for the same period of time, fewer pollutants accumulate on the surface of the hollow fiber membrane bundles in C2. As it can thus be seen, by providing the void passages 131-1 on both of the two end members 130-1, part of the pollutants can be removed smoothly during the process of discharging the raw water, so as to reduce accumulation of the pollutants on the surface of the hollow fiber membrane bundles.

A comparison between the data in the second column C2 and the data in the third column C3 shows that the transmembrane pressure differences of C3 are smaller when the external pressure type hollow fiber membrane assemblies run for the same period of time. As such, after running for the same period of time, fewer pollutants accumulate on the surface of the hollow fiber membrane bundles in C3. As it can thus be seen, in the process of cleaning the external pressure type hollow fiber membrane assembly, the use of the pulse aerator can result in a greater impact on the surface of the hollow fiber membrane bundles, thereby cleaning the surface of the hollow fiber membrane bundles more deeply.

Optionally, in another feasible embodiment, in a direction perpendicular to the axial direction of the housing, the cross section of the void passage may also have a regular or irregular shape such as a fan shape, an annular sector shape, or the like, on condition that pollutants can pass through the void passage.

Further, optionally, the end member is provided with at least four void passages distributed in an annular array, so that the width of the water collection passage between two void passages or the corresponding central angle is not too large. That is, the width of the hollow fiber membrane bundle corresponding to the water collection passage or the corresponding central angle is not too large, so as to avoid deposition of more pollutants on the outer surface of the hollow fiber membrane bundle.

Figure 5:
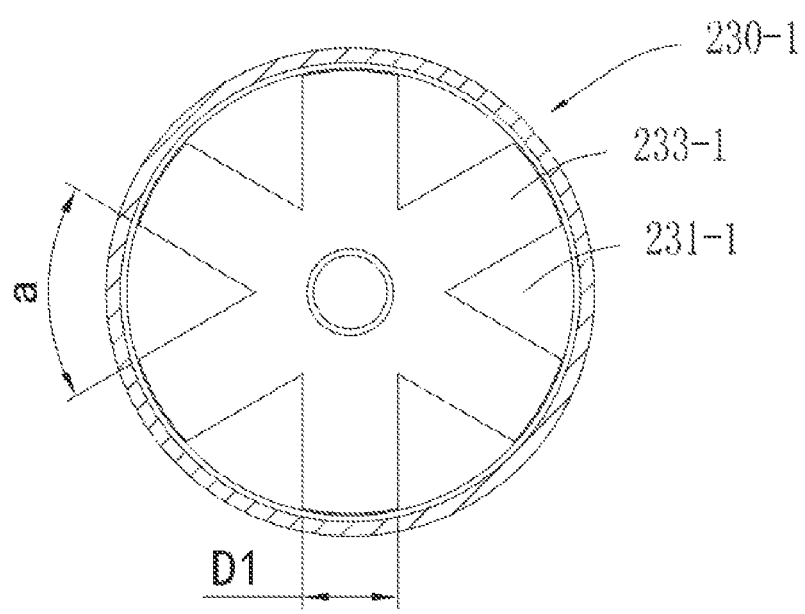
FIG. 5 is a cross-sectional view of an end member of an external pressure type hollow fiber membrane assembly provided according to another embodiment of the present invention.

Specifically, as shown in FIG. 5, in the external pressure type hollow fiber membrane assembly provided according to another embodiment of the present invention, the cross section of the void passages 231-1 is fan-shaped in a direction perpendicular to the axial direction of the housing. The end member 230-1 is provided with six void passages 231-1 distributed in an annular array, and the width D1 of the water collection passages 233-1 is less than 60 mm.

Specifically, in this embodiment, the outer diameter of the housing is 9 inches, and the central angle a of the void passage is 60°. In the direction perpendicular to the axial direction of the housing, the water collection passage 233-1 has a rectangular shape.

TABLE 3

Transmembrane pressure differences of external pressure type
hollow fiber membrane assemblies with water collection passages
233 having different widths D1 as operating time increases

| Running day | D1 = 14 mm Transmembrane pressure difference (KPa) | D1 = 33 mm Transmembrane pressure difference (KPa) | D1 = 40 Transmembrane pressure difference (KPa) | D1 = 45 mm Transmembrane pressure difference (KPa) | D1 = 60 mm Transmembrane pressure difference (KPa) |
|---|---|---|---|---|---|
| 0 | 15 | 15 | 22 | 26 | 31 |
| 1 | 18 | 20 | 31 | 37 | 62 |
| 2 | 25 | 28 | 39 | 50 | 90 |
| 3 | 27 | 37 | 64 | 86 | 130 |
| 4 | 31 | 65 | 90 | 129 | 154 |
| 5 | 36 | 69 | 109 | 136 | 176 |
| 6 | 37 | 70 | 110 | 138 | 189 |
| 7 | 45 | 80 | 112 | 140 | 191 |

As it can be seen from the data in Table 3, when the external pressure type hollow fiber membrane assemblies run for the same period of time, the smaller the width D1 of the water collection passage 233-1, the smaller the transmembrane pressure difference. In other words, when the width D1 of the water collection passage is smaller, and the cross-sectional area of the void passage is larger, fewer pollutants will adhere to the surface of the hollow fiber membrane bundle. That is, more pollutants can be discharged from the inner chamber of the housing.

Of course, in another feasible embodiment, the structure of the void passage is not limited to those described above, and it may also have any other regular or irregular shape.

Likewise, the distribution of the void passages is not limited to that described above, and it may also be a regular or irregular distribution such as a rectangular array distribution.

Figure 6:
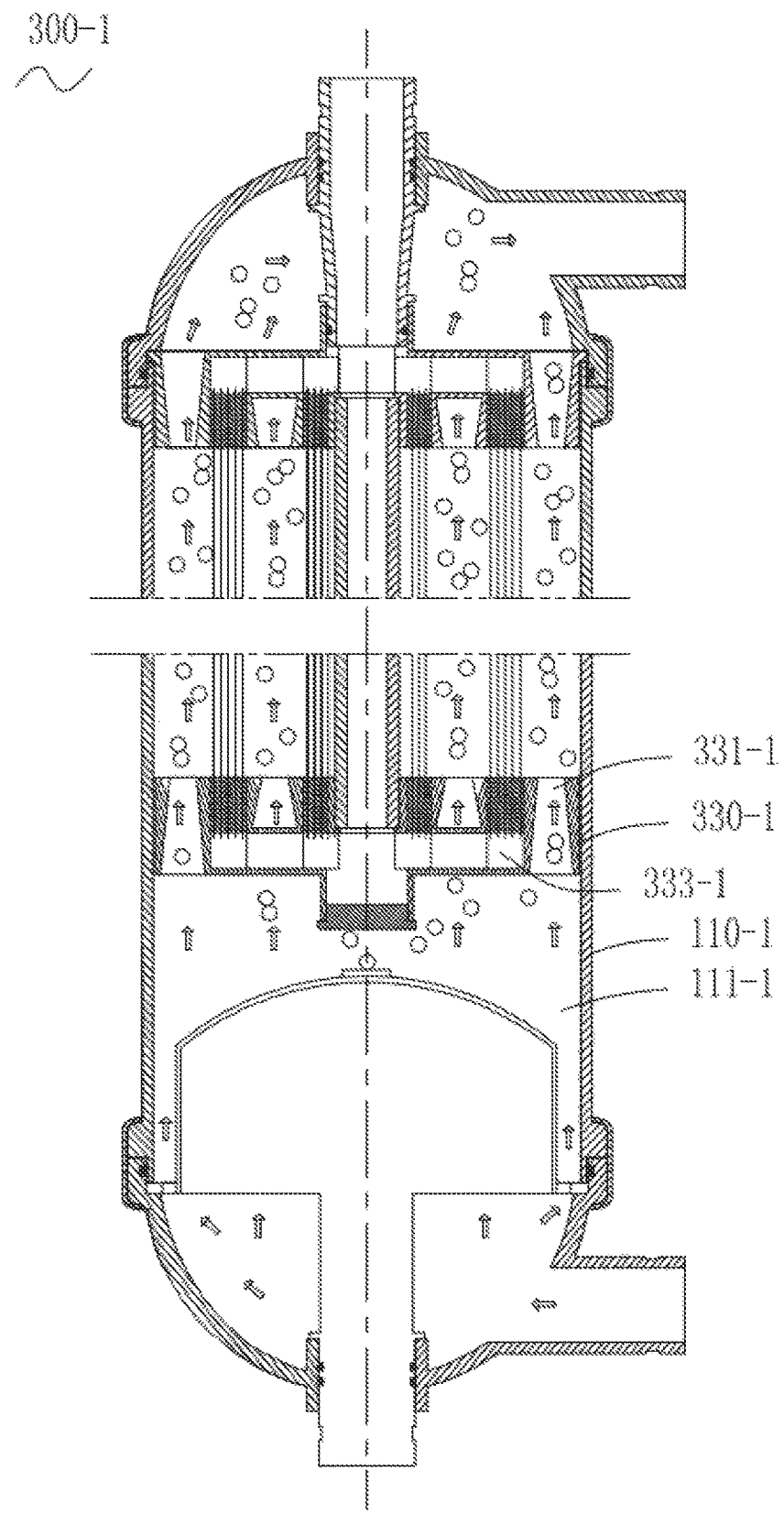
FIG. 6 is a schematic view showing a structure of an external pressure type hollow fiber membrane assembly provided according to another embodiment of the present invention.
Figure 7:
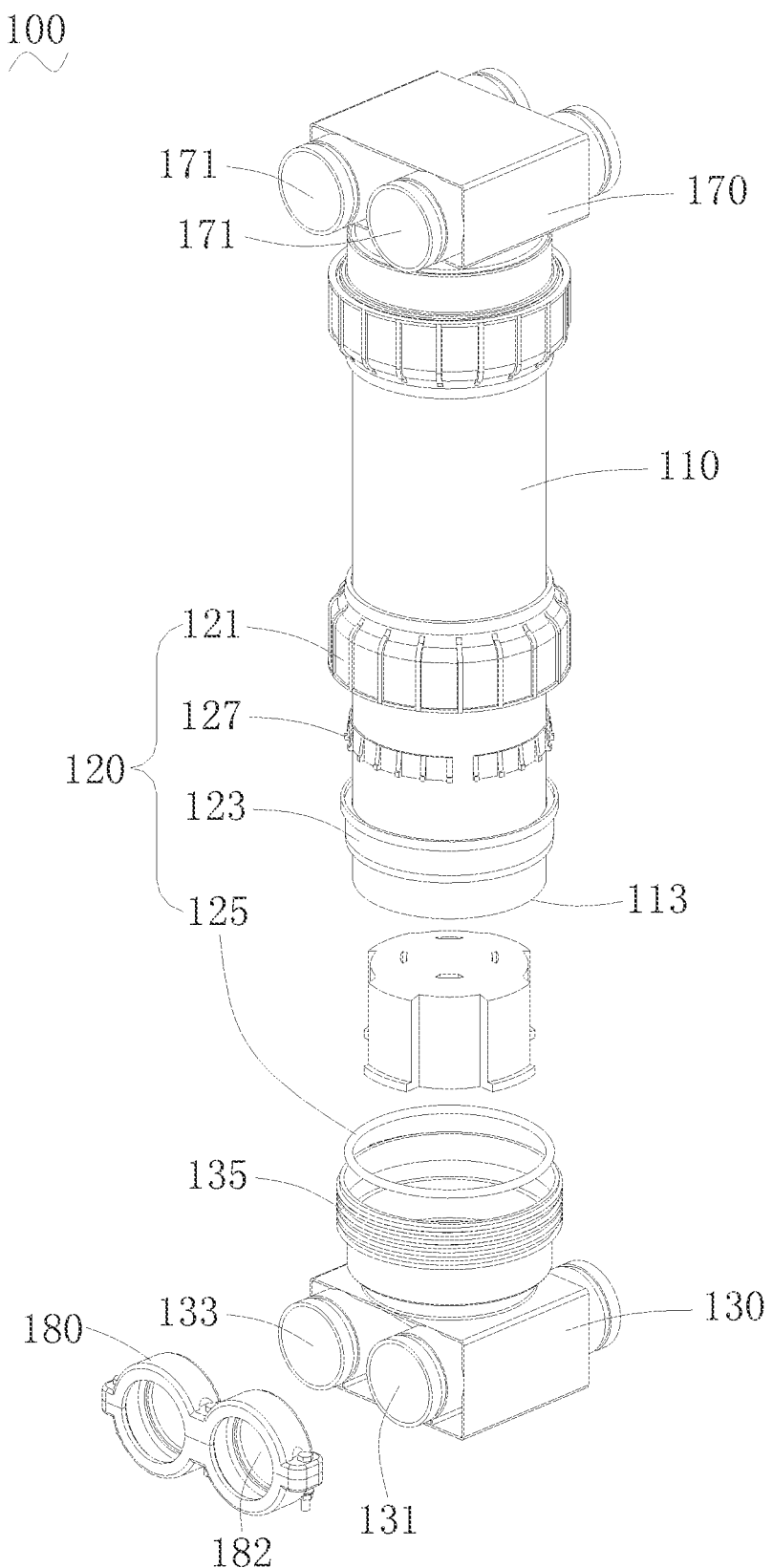
FIG. 7 is a schematic view showing a structure of a filtration membrane assembly provided according to an embodiment of the present invention.
Figure 8:
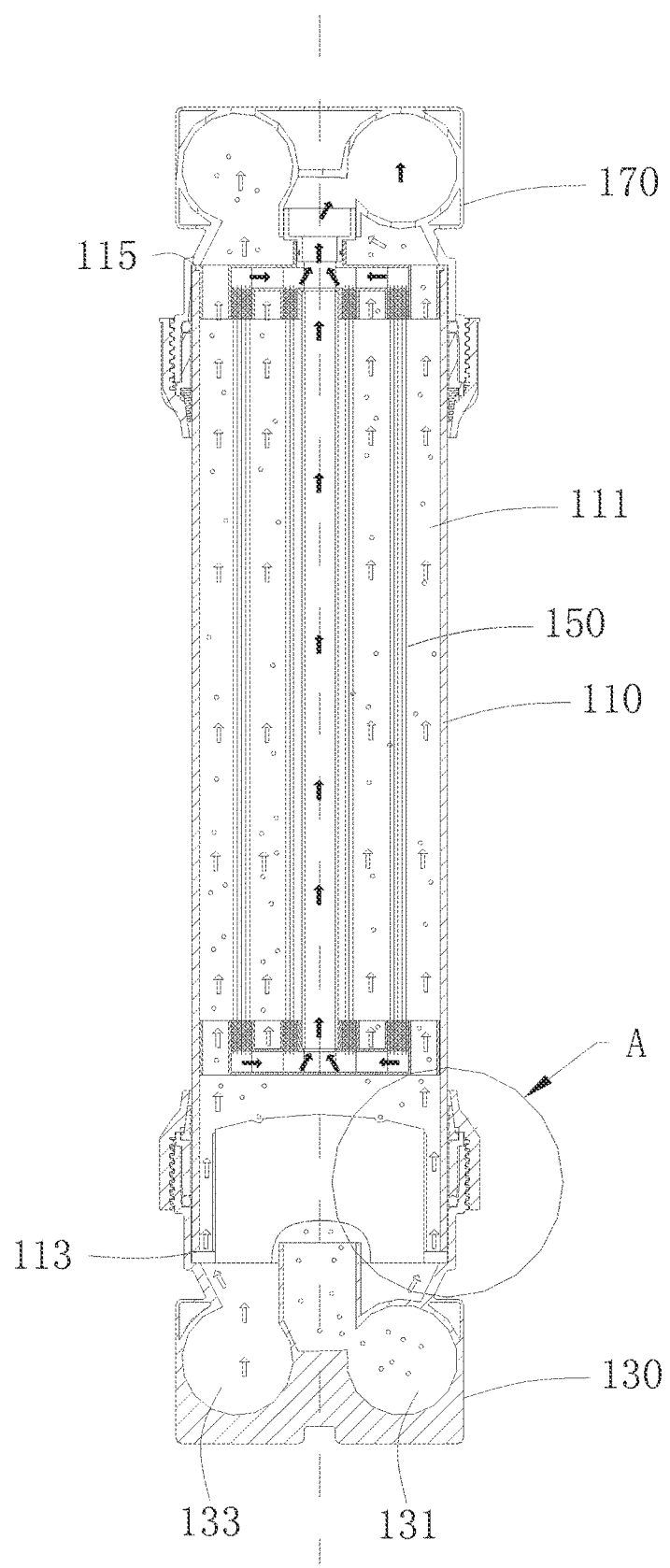
FIG. 8 is a cross-sectional view of the filtration membrane assembly in FIG. 7.

As shown in FIG. 6, in the external pressure type hollow fiber membrane assembly 300-1 provided according to another embodiment of the present invention, the void passages 331-1 and the water collection passages 333-1 are also arranged alternately, similar to the external pressure type hollow fiber membrane assembly 300-1, except that the cross-sectional area of the void passage 331-1 perpendicular to the axial direction of the housing 110-1 decreases gradually from outside to inside in the axial direction of the housing 110-1. The raw water or aeration gas flows through the void passage 331-1 to the inner chamber 111-1 of the housing 110-1. When the raw water or aeration gas flows through the void passage 331-1, because the cross-sectional area of the void passage 331-1 perpendicular to the axial direction of the housing 110-1 decreases gradually from outside to inside, the flow rate of the raw water or aeration gas increases. That is, the velocity of the raw water or aeration gas increases when it flows out of the void passage, thereby increasing the impact force of the raw water or aeration gas on the root of the hollow fiber membrane bundle.

Generally, pollutants adhere to the hollow fiber membrane bundle gradually from the root to the middle, and more pollutants adhere to the root of the hollow fiber membrane bundle. Increasing the impact force of the raw water on the root of the hollow fiber membrane bundle can effectively reduce the pollutants adhered to the root of the hollow fiber membrane. Increasing the impact force of the aeration gas on the root of the hollow fiber membrane bundle can remove the dirt from the root of the hollow fiber membrane bundle more quickly.

In an embodiment of the present invention, there is further provided a filtration device comprising the external pressure type hollow fiber membrane assembly provided by the present disclosure.

In the above-mentioned filtration device, both of the two end members are provided with void passages, so that raw water or aeration gas can be smoothly discharged from the inner chamber of the housing. As a result, the pollutants at the outside of the hollow fiber membrane filaments can flow out easily from the void passages, and unduly accumulation of the pollutants at the roots of the hollow fiber membrane filaments is avoided. Therefore, the filtration energy consumption of the external pressure type hollow fiber membrane assembly is reduced while the filtration efficiency of the external pressure type hollow fiber membrane assembly can be ensured.

As shown in FIGS. 7 to 10, the filtration membrane assembly 100 provided according to an embodiment of the present invention comprises a housing 110 and a first end cap 130. Specifically, the housing 110 has an inner chamber 111, and a first end 113 and a second end 115 opposite to each other. The first end cap 130 is hermetically, fixedly connected to the first end 113 of the housing 110. The first end cap 130 has a gas transmission passage 131 which communicates with the inner chamber of the housing 110 and opens at both sides. The openings of the gas transmission passage 131 are located at lateral sides, thereby facilitating end-to-end joint of the gas transmission passage 131 with a gas transmission passage 131 of another filtration membrane assembly 100.

When the filtration membrane assemblies 100 are assembled into a membrane filtration module, the gas transmission passages 131 of adjacent filtration membrane assemblies 100 are joined end-to-end, and the assembled membrane filtration module only needs to be equipped with one gas transmission pipeline, thereby exempting the necessity to provide a separate gas transmission pipeline for each filtration membrane assembly 100. As such, the assembled membrane filtration module has a simple structure and occupies a small space.

Since the filtration membrane assemblies 100 can be assembled into a membrane filtration module, the filtration membrane assemblies 100 can be handled or transported separately, and assembled after they have been transported to the service environment. Moreover, since the filtration membrane assemblies 100 can be assembled into a membrane filtration module, there is no need to provide a gas transmission pipeline for each filtration assembly 100 separately, so that the membrane filtration module has a simple structure, and can be transported conveniently.

In contrast to a traditional filtration membrane assembly in which the openings of the gas transmission passage are located at the bottom, in this embodiment, the openings of the gas transmission passage 131 are located at the lateral sides. Therefore, when the gas transmission passages of two filtration membrane assemblies 100 are joined end-to-end, an operator can observe the opening positions of the gas transmission passage 131 conveniently. It can be understood that when two gas transmission passages 131 are joined end-to-end, the manipulation position is also at the lateral side of the filtration membrane assembly 100, and the two gas transmission passages can be joined conveniently without lifting the filtration membrane assembly or turning the filtration membrane assembly over.

It can be understood that the filtration membrane assembly 100 further comprises a hollow fiber membrane 150 positioned in the inner chamber of the housing. The filtration membrane assembly 100 conducts external pressure type filtration, and the gas transmission passage 131 communicates with the outside of the hollow fiber membrane 150. Of course, in an alternative embodiment, if the filtration membrane assembly conducts internal pressure type filtration, the gas transmission passage communicates with the inner cavity of the hollow fiber membrane.

It can be understood that the gas transmission passage 131 is used to form a passage for inputting aeration gas to clean the dirt deposited on the surface of the hollow fiber membrane 150.

In this embodiment, the two openings of the gas transmission passage 131 are positioned opposite to each other, and two straight lines perpendicular to the openings of the gas transmission passage 131 are collinear or parallel. It can be understood that in another feasible embodiment, the two openings of the gas transmission passage 131 are not limited to being positioned opposite to each other. That is, the straight lines perpendicular to the two openings of the gas transmission passage 131 may not be parallel. Specifically, the layout of the filtration membrane assembly 100 may be arranged according to the specific use, and then the opening position of the gas transmission passage 131 may be arranged accordingly.

In this embodiment, the first end cap 130 has a first water stream passage 133 that communicates with the inner chamber 111 of the housing 110 and opens at both sides. The first water stream passage 133 may be joined end-to-end to a first water stream passage 133 of another filtration membrane assembly 100. Similarly, when assembled into a membrane filtration module, the first water stream passages 133 of adjacent filtration membrane assemblies 100 are joined end-to-end, thereby exempting the necessity to provide a separate water inlet pipeline for each filtration membrane assembly. As such, the assembled membrane filtration module has a simple structure and occupies a small space.

Similarly, in this embodiment, the filtration membrane assembly 100 conducts external pressure type filtration, and the first water stream passage 133 communicates with the outside of the hollow fiber membrane 150. Of course, in an alternative embodiment, if the filtration membrane assembly conducts internal pressure type filtration, the first water stream passage 133 communicates with the inner cavity of the hollow fiber membrane.

In this embodiment, the gas transmission passage 131 and the first water stream passage 133 are arranged in parallel. It can be understood that in another feasible embodiment, the gas transmission passage and the water stream passage may not be parallel, and the extending directions of the gas transmission passage and the water stream passage may also be non-linear.

In this embodiment, the filtration membrane assembly 100 further comprises a connection assembly 180 that can be removably connected to the opening of the gas transmission passage 131 and the opening of the first water stream passage 133. In other words, the connection assembly 180 is used to realize end-to-end joint between the gas transmission passage 131 and a gas transmission passage 131 of another filtration membrane assembly 100, and the end-to-end joint between the first water stream passage 133 and a first water stream passage 133 of another filtration membrane assembly 100. The connection assembly 180 enables respective joint of the gas transmission passages and the water stream passages of two filtration membrane assemblies at the same time, thereby further simplifying the assembly process of the two filtration membrane assemblies 100.

Figure 9:
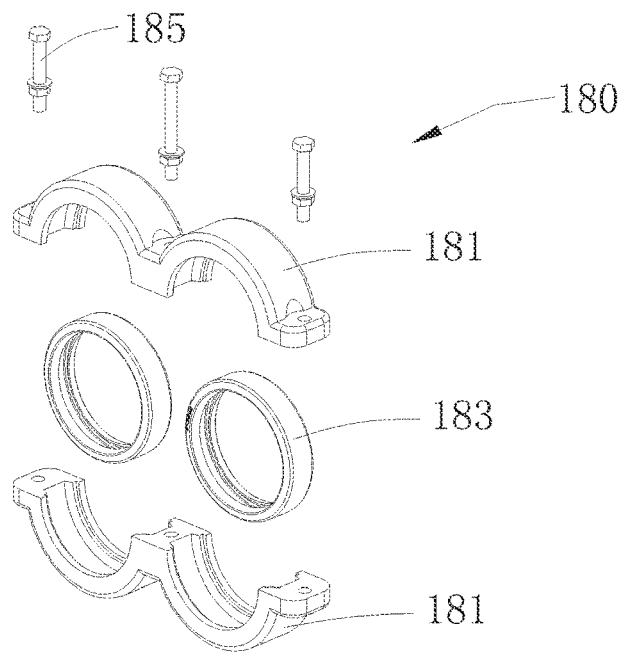
FIG. 9 is a schematic exploded view of a structure of the connection assembly in FIG. 7.
Figure 10:
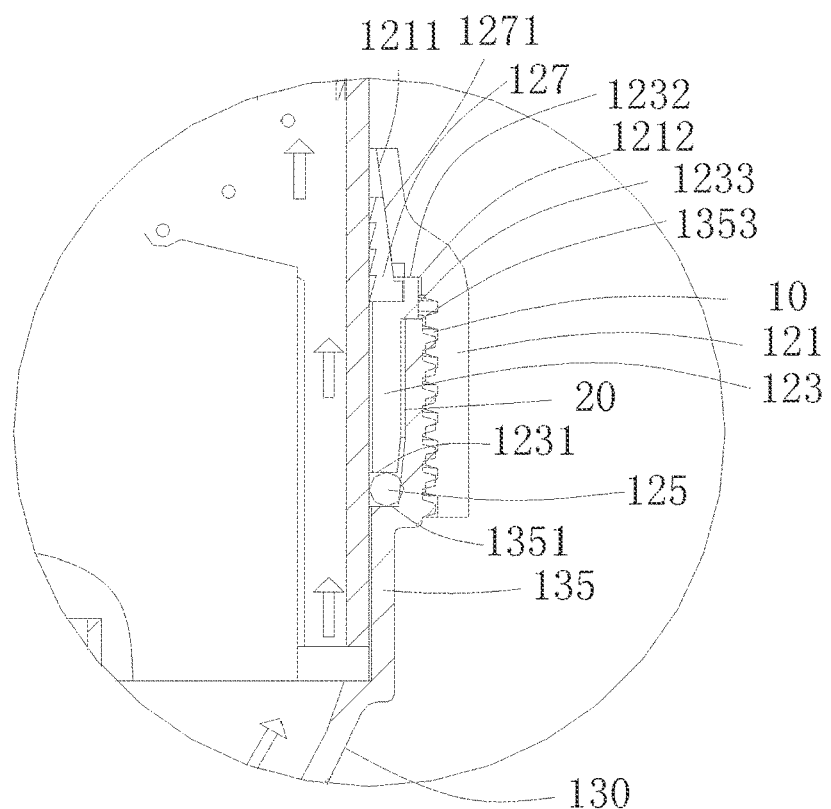
FIG. 10 is a partial enlarged view of A in FIG. 8.

Specifically, in this embodiment, referring to FIG. 9, the connection assembly 180 comprises two double-orifice hoop halves 181 which can be removably joined end-to-end. Specifically, in this embodiment, two double-orifice hoop halves 181 are joined end-to-end with the use of bolts 185. The two double-orifice hoop halves 181 are joined end-to-end to form two orifices 182 for connection to the opening of the gas transmission passage 131 and the opening of the first water stream passage 133 respectively, thereby enabling end-to-end joint of two gas transmission passages 131 and end-to-end joint of two first water stream passages 133.

In this embodiment, the connection assembly 180 further comprises two first sealing rings 183. The two first sealing rings 183 may be arranged respectively in the two orifices 182 formed by locking the two double-orifice hoop halves 181, and used respectively to sleeve outer side walls of the two gas transmission passages 131 at the joining position and the outer side walls of the two first water stream passages 133 at the joining position to avoid leakage of the gas stream and liquid respectively. Of course, in another feasible embodiment, the hermetic connection of two gas transmission passages 131 and the hermetic connection of two first water stream passages 133 are not limited to the above way. Other ways such as sealant seal or air seal are also possible.

In this embodiment, the first end cap 130 and the housing 110 are hermetically connected by the hermetic connection assembly 120. Specifically, referring to FIG. 10, the first end cap 130 has a connection section 135 that can be sleeved on the housing 110, and the outer surface of the connection section 135 is provided with external threads. Specifically, the hermetic connection assembly 120 comprises a threaded sleeve 121 sleeved on the housing 110 and an anti-dropping piece 127 sleeved on the housing 110. The inner surface of the threaded sleeve 121 has an inner thread that matches the outer thread of the first end cap 130 and an abutting surface 1211. The outer side surface of the anti-dropping piece 127 is used for abutting against the abutting surface 1211 of the threaded sleeve 121. It can be understood that the outer side surface 1271 of the anti-dropping piece 127 is a surface of the anti-dropping piece 127 distal from the housing 110. It can be understood that there is a first gap 10 between the inner surface of the threaded sleeve 121 and the outer surface of the housing 110, so that the connection section 135 can be located between the inner surface of the threaded sleeve 121 and the outer surface of the housing 110. As such, threaded connection between the threaded sleeve 121 and the connection section 135 can be achieved. Therefore, when connecting the first end cap 130 and the housing 110, one only needs to put the first end cap 130 and the housing 110 in a proper relative position, and screw the threaded sleeve 121. This can effectively guarantee the position of the first end cap 130 and the housing 110 perpendicular to the axial direction of the housing 110, so that the gas transmission passages 131 of the first end caps 130 of two filtration membrane assemblies 100 can be joined end-to-end successfully. It can be understood that the axial direction of the housing 110 is shown by the dashed line in FIG. 8.

When the first end cap 130 and the housing 110 are to be assembled by means of the hermetic connection assembly 120, one only needs to put the first end cap 130 in a proper position, and screw the threaded sleeve 121. The structure is simple, friendly for operation.

In this embodiment, the abutting surface 1211 of the threaded sleeve 121 is a tapered surface, so that the portion of the threaded sleeve 121 corresponding to the abutting surface 1211 can be easily sleeved on the anti-dropping piece 127.

In this embodiment, the anti-dropping piece 127 is in a shape of a broken loop, so that when the threaded sleeve 121 is gradually sleeved on the anti-dropping piece 127, the anti-dropping piece 127 can be elastically deformed and abut against the housing 110. As such, a pressure perpendicular to the axial direction of the housing 110 is applied to the housing 110, thereby increasing the friction between the housing 110 and the anti-dropping piece 127. As a result, axial sliding of the anti-dropping piece relative to the housing 110 is prevented effectively. At the same time, the anti-dropping piece 127 applies a force to the threaded sleeve 121 in a direction perpendicular to the axial direction of the housing 110, thereby increasing the friction between the threaded sleeve 121 and the anti-dropping piece 127. As a result, axial sliding of the threaded sleeve 121 relative to the anti-dropping piece 127 along the housing 110 is prevented effectively. Therefore, sliding of the threaded sleeve 121 relative to the housing 110 in the axial direction of the housing 110 is prevented effectively, thereby effectively preventing the threaded sleeve 121 from slipping off.

In this embodiment, the inner surface of the anti-dropping piece 127 is a tooth surface, and the hardness of the anti-dropping piece 127 is greater than the hardness of the housing 110. Therefore, when the compressional force between the anti-dropping piece 127 and the housing 110 is large, the outer surface of the housing 110 may be deformed inwardly. When the teeth on the inner side surface of the anti-dropping piece 127 sink into the recesses of the outer surface of the housing 110, sliding of the anti-dropping piece 127 relative to the housing 110 in the axial direction of the housing 110 is further prevented.

In this embodiment, the hermetic connection assembly 120 further comprises a second sealing ring 125 provided between the housing 110 and the connection section 135 of the first end cap 130 to achieve sealing between the housing 110 and the first end cap 130, and prevent leakage of the gas stream or liquid.

In this embodiment, the hermetic connection assembly 120 further comprises a stopper 123 fixedly sleeved on the housing 110. Specifically, in this embodiment, the inner surface of the connection section 135 of the first end cap 130 has a first limit face 1351; and the stopper 123 has a second limit face 1231 disposed opposite to the first limit face 1351. The second limit face 1231 is not parallel to the axial direction of the housing 110, so that when the first limit face 1351 and the second limit face 1231 abut against each other directly or indirectly, the first end cap 130 and the stopper 123 are relatively fixed in the axial direction of the housing 110, so that the first end cap 130 and the housing 110 are relatively fixed in the axial direction of the housing 110.

In this embodiment, the two ends of the second sealing ring 125 abut against the first limit face 1351 and the second limit face 1231 respectively, so as to prevent the second sealing ring 125 from sliding away from the stopper 123 in the axial direction of the housing 110. Further, the end of the stopper 123 distal from the second sealing ring 125 abuts against the anti-dropping piece 127. That is, the stopper 123 is located between the anti-dropping piece 127 and the sealing ring 125, so as to prevent the second sealing ring 125 from sliding to one end of the anti-dropping piece 127 in the axial direction of the housing 110. As such, the position of the second sealing ring 125 in the axial direction of the housing 110 can be better limited, so as to better ensure the sealing between the housing 110 and the first end cap 130.

In this embodiment, both the first limit face 1351 and the second limit face 1231 are flat, and perpendicular to the axial direction of the housing 110. It can be understood that in another feasible embodiment, the first limit face and the second limit face are not limited to being perpendicular to the axial direction of the housing, on condition that the first limit face and the second limit face are not parallel to the axis of the housing. In addition, the first limit face and the second limit face are not limited to flat surfaces, and they may also have regular or irregular shapes such as curved surfaces or folded surfaces. It can be understood that when the first limit face and the second limit face are non-planar, the surfaces where the second sealing ring fits into the first limit face and the second limit face are also curved surfaces, thereby improving the sealing effect of the second sealing ring with the first limit face and the second limit face respectively, i.e. improving the sealing effect between the housing and the first end cap.

In this embodiment, the shapes of the first limit face and the shape of the second limit face are identical. It can be understood that in another feasible embodiment, the first limit face and the second limit face may have different configurations so long as they can abut against the second sealing ring respectively.

In this embodiment, the stopper 123 is a stop ring. It can be understood that in another feasible embodiment, the stopper 123 is not limited to a stop ring so long as it is able to limit the position of the second sealing ring 125 in the axial direction of the housing 110.

In this embodiment, a threaded sleeve limit face 1232 is provided at the end of the stopper 123 distal from the first end 113 of the housing 110, and a stopper abutting surface 1212 matching the threaded sleeve limit face 1232 is provided at the inner side of the threaded sleeve 121. In this embodiment, the threaded sleeve limit face 1232 is a flat surface perpendicular to the axial direction of the housing 110. As such, it's also possible to further limit the position of the stopper in the axial direction of the housing 110, so that the stopper 123 can abut against the second sealing ring 125, thereby better limiting the position of the second sealing ring 125 in the axial direction of the housing 110. It can be understood that in another feasible embodiment, the threaded sleeve limit face 1232 is not limited to a flat surface so long as it's not perpendicular to the axial direction of the housing 110.

In addition, the provision of the stopper 123 further limits the position of the anti-dropping piece 127 in the axial direction of the housing 110, so as to ensure that the anti-dropping piece 127 abuts against the abutting surface 1211. As a result, the threaded sleeve 121 can be better fixed relative to the housing 110.

In this embodiment, the stopper 123 also serves to limit the position of the first end cap 130 in the axial direction of the housing 110, so that the first end cap 130 and the housing 110 are relatively fixed after they are assembled. In addition, when the stopper is used to limit the position of the first end cap 130 in the axial direction of the housing 110, the first end cap 130 abuts against the stopper 123, so that the stopper 123 bears at least part of the pressure applied by the first end cap 130 to the housing 110, which in turn effectively reduces or eliminates the pressure applied by the first end cap 130 to the end of the housing 110. Hence, the end of the housing 110 is not so susceptible to damage caused by a large force.

Further, in this embodiment, the stopper 123 is also provided with a third limit face 1233 which matches the end face 1353 of the connection section 135 of the first end cap 130, and serves to relieve the pressure applied by the first end cap 130 to the second limit face 1231 of the stopper 123.

Of course, it can be understood that in other feasible embodiments, the manners for fixing the first end cap relative to the housing in the axial direction of the housing are not limited to those described above. For example, the position of the first end cap in the axial direction of the housing may be limited directly with the use of the end face of the housing.

Optionally, the stopper 123 is hermetically connected to the housing 110, and the second sealing ring 125 also abuts against the outer surface of the housing 110, so as to further improve the sealing effect between the housing 110 and the first end cap 130.

Of course, in another feasible embodiment, the manner for achieving sealing between the housing 110 and the first end cap 130 is not limited to that described above. Other manners such as sealant seal and the like are also possible.

In this embodiment, there is a second gap 20 between the connection section 135 of the first end cap 130 and the housing 110, and the stopper 123 is located in the second gap 20 between the housing 110 and the connection section 135 of the first end cap 130. Of course, in another feasible embodiment, the stopper is not limited to being located in the second gap between the connection section of the first end cap and the housing. Accordingly, the second gap between the housing and the connection section of the first end cap may also be set to be smaller, so long as the connection section can be sleeved on the housing conveniently.

In this embodiment, the filtration membrane assembly 100 further comprises a second end cap 170 that is hermetically, fixedly connected to the second end 115 of the housing 110. Two water stream passages 171 are provided on the second end cap 170, and both of the two water stream passages communicate with the inner chamber 111 of the housing 110. Specifically, the two water stream passages 171 are a second water stream passage 171b and a purified water stream passage 171a respectively. The second water stream passage 171b is used to input raw water, discharge concentrated water or discharge aeration gas, and the other water stream passage 171a is used to discharge filtered water. The filtration membrane assembly 100 is an external pressure type filtration membrane assembly. Thus, the second water stream passage 171b communicates with the outside of the hollow fiber membrane 150, and the purified water stream passage 171a communicates with the inner cavity of the hollow fiber membrane 150.

In this embodiment, the second end cap 170 and the housing 110 are hermetically, fixedly connected the same way as the first end cap 130 and the housing 110 are hermetically, fixedly connected. The same description will not be repeated here.

It can be understood that in another feasible embodiment, the end-to-end joint of the gas transmission passages of two filtration membrane assemblies is not limited to the use of the connection assembly. A connection structure may also be provided to achieve end-to-end joint of only the gas transmission passages of two filtration membrane assemblies.

Of course, in another feasible embodiment, it is also possible to provide a mechanism on the outer side wall of the gas transmission passage near the opening, so as to achieve direct end-to-end joint of the openings of the gas transmission passages of two filtration membrane assemblies. For example, by engaging the outer side walls of the two gas transmission passages at the openings, the openings of the gas transmission passages of the two filtration membrane assemblies can be joined end-to-end.

Figure 11:
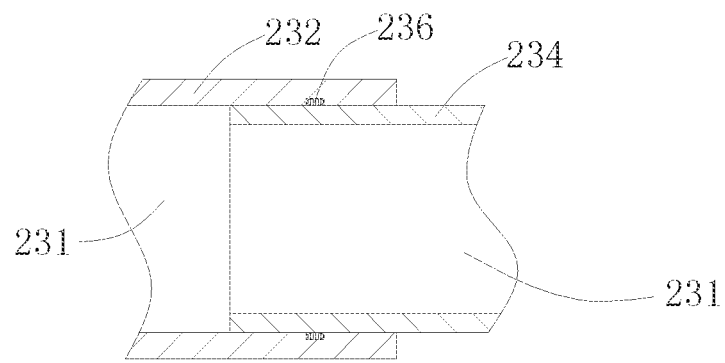
FIG. 11 is a schematic view showing a structure of the abutting portion of two gas transmission passages of a filtration membrane assembly provided according to an embodiment of the present invention.

FIG. 11 shows a manner in which the gas transmission passages 231 of two filtration membrane assemblies are joined end-to-end according to another embodiment of the present invention. Specifically, the outer side wall of the gas transmission passage 231 close to one opening constitutes a first abutting section 232, and the outer side wall of the gas transmission passage 231 close to the other opening constitutes a second abutting section 234. The first abutting section 232 can be fixedly, hermetically sleeved on the second abutting section 234 of another filtration membrane assembly.

Specifically, in this embodiment, the first abutting section 232 and the second abutting section 234 are hermetically connected with the aid of a third sealing ring 236. Of course, in another feasible embodiment, the hermetic connection between the first abutting section and the second abutting section can also be achieved in other ways, such as sealant seal or air seal.

In this embodiment, the first abutting section 232 and the second abutting section 234 are fixedly connected by interference fit. It can be understood that in another feasible embodiment, the manner in which the first abutting section and the second abutting section are fixedly connected is not limited to that described above. It's also possible that they are connected by clamping.

Figure 12:
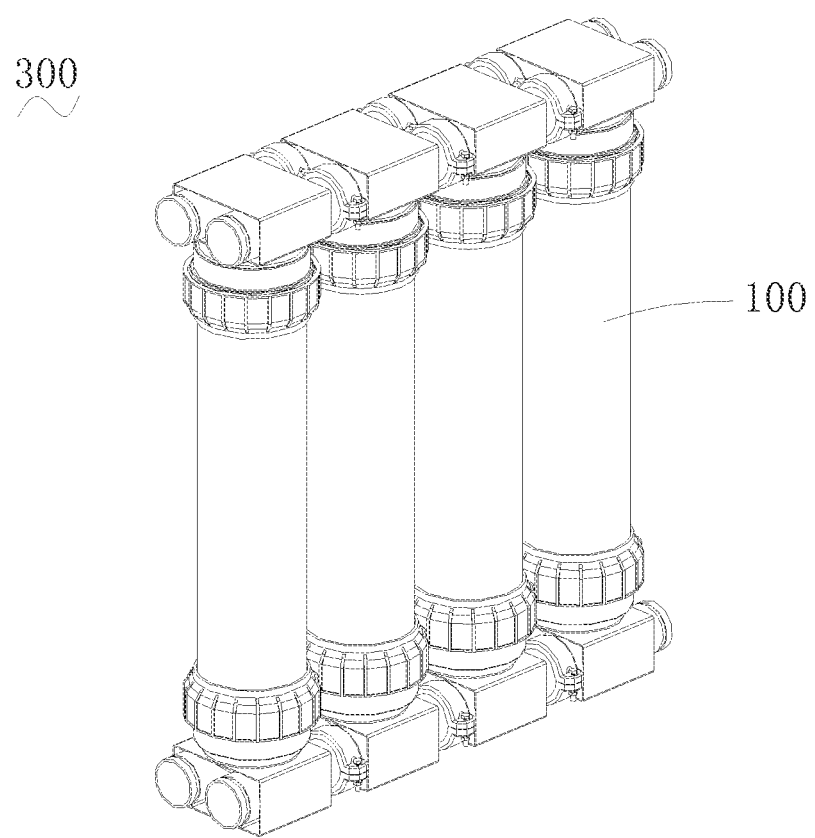
FIG. 12 is a schematic view showing a structure of a membrane filtration module provided according to an embodiment of the present invention.
Figure 13:
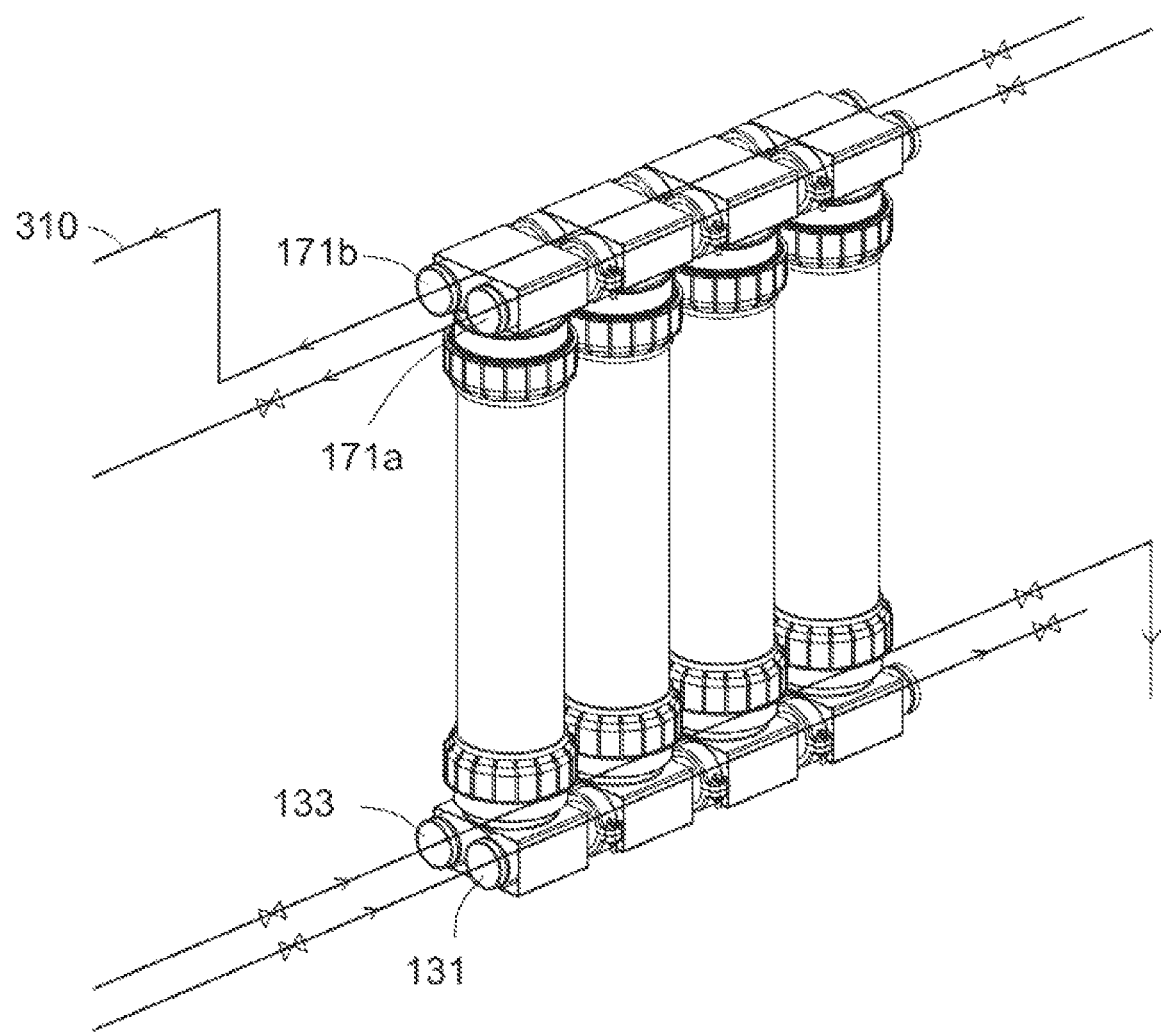
FIG. 13 is a schematic view showing a working mode of the membrane filtration module shown in FIG. 12.
Figure 14:
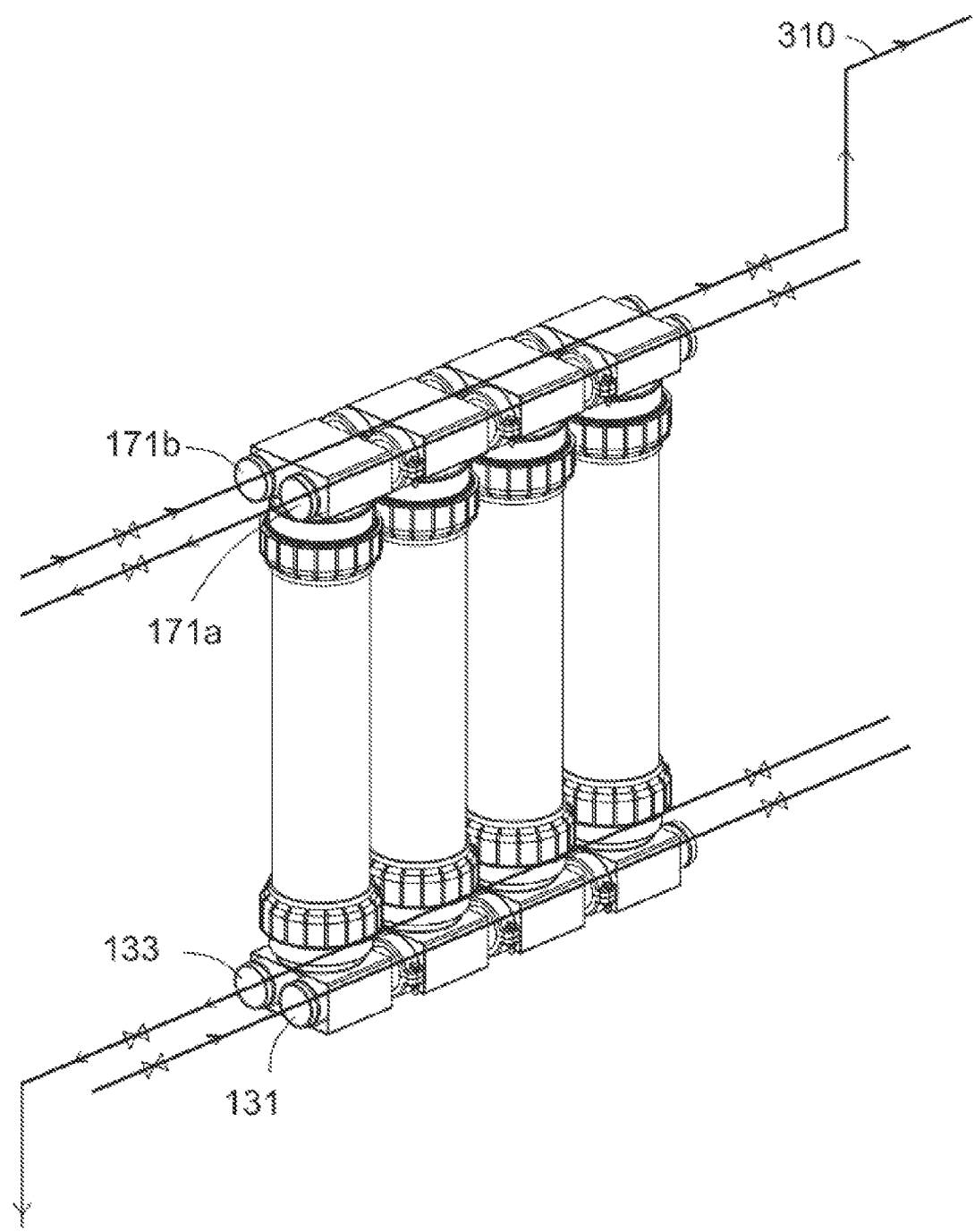
FIG. 14 is a schematic view showing another working mode of the membrane filtration module shown in FIG. 12.

As shown in FIGS. 12 to 14, the membrane filtration module 300 provided according to an embodiment of the present invention comprises the filtration membrane assembly 100 provided by the present invention.

In the membrane filtration module 300, the gas transmission passages of adjacent filtration membrane assemblies are joined end-to-end, and thus it's not necessary to provide a gas transmission pipeline for each filtration membrane assembly separately. As such, the assembled membrane filtration module has a simple structure and occupies a small space.

In this embodiment, the membrane filtration module 300 further comprises a pressurizing pipeline 310 in communication with the second water stream passage 171b. The spacing between the pressurizing pipeline 310 and the second end 115 of the housing 110 is greater than the spacing between the purified water stream passage 171a and the second end 115 of the housing 110. Generally, during use, the height of the second end cap 170 is higher than the height of the first end cap 130. Therefore, the provision of the pressurizing pipeline 310 can increase the water level in the inner chamber of the housing 110, thereby facilitating the permeation of the purified water through the hollow fiber membrane 150. As such, the filtration efficiency of the membrane filtration module can be improved.

Optionally, the height difference between the pressurizing pipeline 310 and the water stream passage 171a is 200 mm to 3000 mm.

Optionally, referring to FIG. 13, one way to use the membrane filtration module 300 is that the first water stream passage 133 is used as a passage for inputting raw water and discharging concentrated water, and the water stream passage 171a is used as a passage for discharging filtered water. The gas transmission passage 131 is used to input compressed air to achieve cleaning of the hollow fiber membrane. After the cleaning is completed, the concentrated water in the inner chamber 111 of the housing 110 may be discharged through the first water stream passage 133.

Of course, when the liquid level in the housing 110 is increased to the position of the pressurizing pipeline 310, the concentrated water can also be discharged through the pressurizing pipeline 310.

Optionally, referring to FIG. 14, another way to use the filtration membrane assembly 100 is that the water stream passage 171b is used as a passage for inputting raw water, and the water stream passage 171a is used as a passage for discharging filtered water. That is, the raw water is input from the end of the water stream passage 171b distal from the pressurizing pipeline 310. The gas transmission passage 131 is used to input compressed air to achieve cleaning of the hollow fiber membrane. After the cleaning is completed, the concentrated water in the inner chamber 111 of the housing 110 may be discharged through the first water stream passage 133. Of course, when the liquid level in the housing 110 is increased to the position of the pressurizing pipeline 310, the concentrated water can also be discharged through the pressurizing pipeline 310.

The technical features in the above embodiments can be combined in any way. For the sake of brevity, the description does not include each and every possible combination of the various technical features in the above-mentioned embodiments. However, as long as a combination of these technical features does not contradict the concept of the present invention, it should be considered as falling in the scope of this specification.

The above embodiments only exemplify several ways to implement the present invention, and they are described specifically in detail. However, they should not be construed as limitations to the scope of the present patent application for invention. It should be noted that, for those skilled in the art, variations and modifications can be made without departing from the concept of the present invention, and they all fall in the protection scope of the present invention. Therefore, the protection scope of the present patent application for invention should be defined by the appended claims.

What is claimed is:

1. An external pressure type hollow fiber membrane assembly, comprising:
    a housing having an inner chamber;
    two end members provided at two ends of the inner chamber of the housing respectively, wherein each of the two end members is provided with at least two void passages extending through the end member along an axial direction of the housing, and at least two water collection passages in communication with each other, wherein the at least two void passages and the at least two water collection passages are provided alternately, and a ratio of a width of one of the at least two water collection passages to a width of one of the at least two void passages being less than 6; and
    a plurality of hollow fiber membrane bundles provided in the inner chamber of the housing, the hollow fiber membrane bundles having a width of less than or equal to 60 mm,
    wherein the at least two void passages are configured so that raw water enters the inner chamber of the housing from the at least two void passages of a first one of the two end members and is discharged from the at least two void passages of a second one of the two end members and to discharge pollutants at an outside of the hollow fiber membrane bundles, and
    wherein the at least two water collection passages are configured to collect filtrate from the inner cavity of a hollow fiber membrane of the hollow fiber membrane bundles, and each of the at least two water collection passages corresponds to a respective one of the hollow fiber membrane bundles.

2. The external pressure type hollow fiber membrane assembly according to claim 1, wherein in a direction perpendicular to the axial direction of the housing, an extending direction of one of the at least two void passages is a straight line, and the at least two void passages are parallel to each other.

3. The external pressure type hollow fiber membrane assembly according to claim 1, wherein in a direction perpendicular to the axial direction of the housing, the hollow fiber membrane bundle has a cross section that is circular and has an outer diameter of less than 60 mm.

4. The external pressure type hollow fiber membrane assembly according to claim 1, wherein in a direction perpendicular to the axial direction of the housing, one of the at least two void passages has a cross section that is fan-shaped or annular-sector-shaped.

5. The external pressure type hollow fiber membrane assembly according to claim 1, wherein a cross-sectional area of one of the at least two void passages perpendicular to the axial direction of the housing decreases gradually from outside to inside in the axial direction of the housing.

6. The external pressure type hollow fiber membrane assembly according to claim 1, further comprising a first end cap hermetically connected to an end of the housing, wherein a pulse aerator is provided at a side of the first end cap proximal to the inner chamber of the housing.

7. The external pressure type hollow fiber membrane assembly according to claim 6, wherein the pulse aerator has a gas stream release hole proximal to one of the two end members, and the gas stream release hole is coaxial with the pulse aerator.

8. A filtration membrane assembly, comprising:
    a housing comprising: an inner chamber, and a first end and a second end opposite to each other;
    a first end cap hermetically, fixedly connected to the first end of the housing, wherein the first end cap has a gas transmission passage which communicates with the inner chamber of the housing and opens at both sides;
    a hollow fiber membrane; and
    a second end cap hermetically, fixedly connected to the second end of the housing; wherein the second end cap is provided with a second water stream passage and a purified water stream passage, wherein the second water stream passage communicates with an outside of the hollow fiber membrane, and
    wherein the hollow fiber membrane is the external pressure type hollow fiber membrane assembly of claim 1.

9. The filtration membrane assembly according to claim 8, wherein the first end cap further has a first water stream passage which communicates with the inner chamber of the housing and opens at both sides, wherein the first water stream passage is configured to be capable of being joined end-to-end to a water stream passage of another filter membrane assembly, and wherein the filter membrane assembly further comprises a connection assembly which is removably connected to both an opening of the gas transmission passage and an opening of the first water stream passage.

10. The filtration membrane assembly according to claim 9, wherein the connection assembly comprises two double-orifice hoop halves configured to be removably joined end-to-end, wherein after the two double-orifice hoop halves are joined end-to-end, two orifices are formed for connection to the opening of the gas transmission passage and the opening of the first water stream passage respectively.

11. The filtration membrane assembly according to claim 9, wherein an outer side wall of the gas transmission passage close to one of the openings forms a first abutting section, and an outer side wall of the gas transmission passage close to the other of the openings forms a second abutting section.

12. The filtration membrane assembly according to claim 8, wherein the first end cap is hermetically connected to the housing with a hermetic connection assembly, and/or the second end cap is hermetically connected to the housing with a hermetic connection assembly, wherein the first end cap and the second end cap each have a connection section configured to be capable of being sleeved on the housing, wherein an outer surface of the connection section is provided with an external thread, and wherein the hermetic connection assembly comprises:
a threaded sleeve which can be sleeved on the housing, wherein an inner surface of the threaded sleeve comprises: an internal thread that matches the external thread of the first end cap, and an abutting surface, and an anti-dropping piece which can be sleeved on the housing, wherein an outer side surface of the anti-dropping piece is used for abutting against the abutting surface of the threaded sleeve.

13. The filtration membrane assembly according to claim 12, wherein the abutting surface of the threaded sleeve is a tapered surface, the anti-dropping piece is in a shape of a broken loop,-an inner surface of the anti-dropping piece is a tooth surface, and the anti-dropping piece has a hardness greater than that of the housing.

14. The filtration membrane assembly according to claim 12, wherein the hermetic connection assembly further comprises a sealing ring provided between the housing and the connection section of the first end cap or the connection section of the second end cap.

15. The filtration membrane assembly according to claim 14, wherein the hermetic connection assembly further comprises a stopper sleeved on the housing, an inner surface of the connection section of the first end cap has a first limit face, the stopper has a second limit face disposed opposite to the first limit face, the second limit face is not parallel to an axial direction of the housing, both ends of the sealing ring abut against the first limit face and the second limit face, and an end of the stopper distal from the sealing ring abuts against the anti-dropping piece.

16. The filtration membrane assembly according to claim 8, further comprising: a pressurizing pipeline in communication with the second water stream passage, wherein a spacing between the pressurizing pipeline and the second end of the housing is greater than a spacing between the purified water stream passage and the second end of the housing.

17. A membrane filtration module, comprising the filtration membrane assembly of claim 8.

* * * * *